Patented July 29, 1947

2,424,884

UNITED STATES PATENT OFFICE 2,424,884

SULFUR VULCANIZATION OF UNSATURATED REACTION PRODUCTS OF DIISOCYANATE WITH LINEAR POLYESTERS AND LINEAR POLYESTER-AMIDES AND PRODUCTS RESULTING THEREFROM

James Gordon Cook, David Augustine Harper, Reginald John William Reynolds, and Walter Fairbairn Smith, Blackley, Manchester, England, assignors to Imperial Chemical Industries Limited, a corporation of Great Britain No Drawing. Application February 17, 1944, Serial No. 522,800. In Great Britain December 7, 1942

8 Claims. (Cl. 260—75)

This invention relates to the vulcanisation of polymeric materials.

It has already been proposed to manufacture polymeric materials by heating together polyester-forming ingredients in the presence or absence of polyamide-forming ingredients. For instance, such polymeric materials are obtained by heating a glycol and/or an amino-alcohol with a dibasic carboxylic acid, optionally in the presence of one or more additional ingredients, namely, a diamine, an aminocarboxylic acid or a hydroxycarboxylic acid; alternatively, one or more of the ingredients may be used in the form of the corresponding ester- or amide-forming derivatives. The amounts of the various ingredients are selected so that there are present approximately chemically equivalent proportions of their complementary ester-forming groups and also of their complementary amide-forming groups, if amide-forming ingredients are used. The polyesters or polyester-amides which may be obtained in this way are usually soft waxes or syrups with a relatively low molecular weight.

It has been proposed to convert these low molecular weight polymers into tough polymers of considerably higher molecular weight by heating them with small proportions of an organic diisocyanate, for example hexamethylene diisocyanate. Furthermore, it has been proposed so to treat such low molecular weight polymers which have been obtained by reacting the several ingredients in such proportions that there is present in the reaction mixture a small excess of an alcoholic hydroxyl-containing ingredient over and above that theoretically required. If just sufficient of the diisocyanate to react with the end groups in the low molecular weight polymers is used in their conversion into the high molecular weight polymers, there are obtained polymers which can be extruded into cold-drawable filaments. If greater proportions of the diisocyanates are used, there are obtained tough, rubbery, high molecular weight polymers which cannot be extruded into cold-drawable filaments. If still greater proportions of the diisocyanates are used, there are obtained tough rubbery polymers which cannot be compounded on a rubber mill.

We have now found that certain of these organic diisocyanate-modified polyesters or polyester-amides may be vulcanised by heating with sulphur in presence of an accelerator, and in that they are thereby converted into materials with enhanced rubber-like properties. For instance, the vulcanised polymeric materials have an increased resilience, softening point and hardness, a decreased permanent set, and an increased resistance to swelling by or solution in organic liquids, for example benzene-ethanol mixtures.

The organic diisocyanate modified polyesters or polyester-amides which may be vulcanised with sulphur in this way are those derived from polyamide- and/or polyester-forming ingredients at least one of which contains an unsaturated linkage of the non-benzenoid type, that is an olefinic or acetylenic linkage; they will be referred to herein as organic diisocyanate-modified unsaturated polyesters or polyester-amides.

Thus, according to the present invention we provide a process for the manufacture of vulcanised polymeric materials which comprises vulcanising mixtures comprising an organic diisocyanate-modified unsaturated polyester or polyester-amide, sulphur and a vulcanisation accelerator.

In carrying out the process of the invention the organic diisocyanate-modified unsaturated polyester or polyester-amide is mixed with the sulphur and the accelerator, conveniently on a rubber mill. The milling may be conducted at ordinary or elevated temperatures, depending on the aptitude of the polymeric material for milling. The temperature is not allowed to become so high, usually not higher than 65–100° C., as to cause appreciable vulcanisation on the mill. Usually the milling is continued only for as long as is required to give a satisfactory mixing of the materials being used, since prolonged milling may cause changes in the physical properties of the polymeric material.

Examples of vulcanisation accelerators include zinc diethyl dithiocarbamate, zinc phenyl ethyl dithiocarbamate, zinc isopropyl xanthate, diethylammonium diethyl dithiocarbamate, mercaptobenzthiazole, diphenylguanidine, tetramethylthiuram disulphide and tetraethylthiuram disulphide; mixtures of these may be used if desired.

As well as those already mentioned, one or more additional compounding ingredients may also be used. These include fillers, for example, carbon black, iron oxide, clay, asbestos, blanc fixe, whiting, lithopone and mica; other plastic materials, for example, natural or synthetic rubbers, vulcanised vegetable oils, dark substitute, white substitute, a cumar resin, wood rosin and pitch; de-tackifying agents, that is to say materials which reduce the tendency of the mix to stick to the rolls, for example, stearic acid, paraffin wax, oleic acid, lauric acid and dibutyl ammonium oleate; plasticisers, for example, tricresyl phosphate, dibutyl phthalate, butylphthalyl butyl glycollate, and N-alkyl-toluene-sulphonamides; stabilisers or anti-oxidants, for example, hydroquinone, N : N'-hexamethylene-bis-orthohydroxy-benzamide, N-phenyl-α-naphthylamine, N-phenyl-β-naphthylamine and α:α-bis(2-hydroxy-3:5-dimethyl-phenyl) butane, as well as others commonly used in rubber technology. Small quantities of pigments, for example from 1-3% by weight, such as are customarily used in rubber technology may also be used to impart colour. The use of alkaline reacting compounding ingredients should be avoided since these may cause degradation of the polymeric materials.

Suitable proportions of the ingredients are from about 1 to 5 parts of sulphur, and from about 1 to 2 parts of vulcanisation accelerator per 100 parts by weight of the polymeric material, but smaller or greater proportions may be used if desired. As the amount of sulphur is increased so the harness of the vulcanised material is increased. The proportions of the other ingredients, if used, vary with the effects it is desired to produce, and are adjusted accordingly.

When the ingredients are mixed together, the mix is vulcanised by heating, for example in a press or mould or in hot air; if desired, before vulcanising, the mix is formed into shapes or spread or calendered on to a substrate, for example on to the surface of a fabric. If desired, to facilitate the shaping or spreading, organic solvents or swelling agents may be incorporated with the mix; these are removed prior to or during vulcanisation.

The temperature and time of vulcanisation vary with the nature of the polymer. Periods of time of 30 to 90 minutes at temperatures of about 100° to 150° C. are usually suitable.

A variety of articles may be constructed from the vulcanised materials obtained in accordance with this invention. In the construction of these articles the materials may be supported on a substrate and/or interspersed with a filler. For instance, the materials may be used in the construction of petrol- and/or oil-resistant articles of all kinds, for example gaskets, packings, hose, diaphragms for pumps and the like, as well as in the fabrication of flexible containers. They may also be used in the manufacture of rollers, blankets and stereos for use in the printing industry, or to provide protective sheathings for insulated electric cables. They also find application in the construction of balls for games, tires, elastic threads, conveyor or transmission belting, engine bearings, coated fabrics, including protective clothing and floor coverings, and generally in the construction of articles requiring the use of a material having physical properties resembling those of rubber, but also having a good resistance to the action of organic fluids and a low permeability to gases and vapours.

Polyester- and polyamide-forming reactants which contain no unsaturated linkages of the non-benzenoid type and which are suitable for use in conjunction with the unsaturated ingredients in making the soft, waxy, low molecular weight polymers include glycols, for example, ethylene glycol, diethylene glycol, trimethylene glycol, pentamethylene glycol, hexamethylene glycol, dodecamethylene glycol, 1:12-octadecanediol and pentaglycol; aliphatic or aromatic aminoalcohols having at least one hydrogen atom attached to the amino nitrogen atom and preferably containing an aliphatic chain of at least two carbon atoms separating the amino and hydroxyl groups, for example β-ethanolamine and 3-aminopropanol; dibasic carboxylic acids or ester-forming derivatives thereof, preferably aliphatic dicarboxylic acids, for example, malonic, succinic, glutaric, adipic, β-methyladipic, pimelic, suberic, azelaic, sebacic, undecanedioic, brassylic, isophthalic, hexahydroterephthalic p-phenylenediacetic, and acetone-dicarboxylic acids; primary and secondary diamines, for example, ethylene diamine, hexamethylenediamine, 3-methylhexamethylene diamine, decamethylenediamine, m-phenylenediamine, N:N'-dimethylhexamethylenediamine, N:N'-diethylhexamethylenediamine and N:N'-dimethyldecamethylenediamine; monohydroxymonocarboxylic acids or their ester-forming derivatives, for example, glycollic, 6-hydroxycaproic, 10-hydroxydecanoic and 12-hydroxystearic acids; polymerizable monoamino-monocarboxylic acids, or their ester-forming derivatives, for example, 6-aminocaproic acid or its lactam, caprolactam, and 9-aminononanoic, 11-aminoundecanoic and 12-aminostearic acids.

Polyester- and polyamine-forming reactants which contain unsaturated linkages of the non-benzenoid type and which are suitable for making the soft, waxy, low molecular weight polymers include unsaturated dibasic carboxylic acids or their ester-forming derivatives, for example, maleic, fumaric and dihydromuconic acids, acetylene dicarboxylic acid and itaconic acid; unsaturated aliphatic diamines, for example, 1:4-diamino-butene; unsaturated glycols, for example, 1:4-butene diol. Suitable proportions of the reactants containing the unsaturated linkages are from 5 to 25 parts per 100 parts by weight of the total reactants; it will be understood that, in accordance with the hereinbefore expressed requirement, the proportions of the reactants are so chosen that there are present approximately chemically equivalent proportions of their complementary ester-forming groups and also of their complementary amide-forming groups, if amide forming reactants are used.

The low molecular weight polymers are made by heating the selected reactants at polymerizing temperatures, usually in the absence of air or oxygen, under conditions whereby water is removed from the reaction mixture. When a diamine is to be used, it is conveniently used in the form of the corresponding diammonium salt from some of the dibasic carboxylic acid to be used. In the main, under these conditions, linear polymers are formed by condensation polymerisation, but due to the presence of reactants containing unsaturated linkages non-linear or cross-linked polymers may also be formed by addition polymerization. If there is much cross-linking, the products gel; this can usually be obviated by including with the reactants a small proportion of a polymerization inhibitor such as hydroquinone, copper powder or copper rosinate.

The low molecular weight polymers are converted into the high molecular weight polymers, that is to say the organic diisocyanate-modified unsaturated polyesters or polyester-amides, by mixing them, for example by stirring, milling or kneading, with the organic diisocyanate and then heating the mixture, for example, to a temperature of 100–200° C. for a period of 10–720 minutes. Up to about 10 per cent, usually 3–7%, by weight of the diisocyanate is used, that is to say, sufficient diisocyanate to give a polymer of suitable physical properties for subsequent processing on a rubber mill. If the low molecular weight polymer is appreciably cross-linked, then a smaller proportion of diisocyanate is required, usually about 1–2%. The polymers modified with diisocyanates may be polyesters having no recurring intralinear carbonamide groups or they may be polyester-amides having a ratio of intralinear ester to carbonamide groups of 1:1, as in the case of polyesters made from dibasic acid and ethanolamine or having a higher ratio of ester to amide groups.

Examples of organic diisocyanates include ethylene diisocyanate, trimethylene diisocyanate, tetramethylene diisocyanate, hexamethylene diisocyanate, decamethylene diisocyanate, m-phenylene diisocyanate, p:p'-diphenyl diisocyanate and naphthalene diisocyanates. Of these the aliphatic diisocyanates, especially hexamethylene diisocyanates, are preferred.

The invention is illustrated but not limited by the following examples, in which the parts are expressed by weight, unless otherwise stated:

Example 1

100 parts of an organic diisocyanate-modified unsaturated polyester, 5 parts of tricresyl phosphate, 1.0 part of stearic acid, 60 parts of carbon black, 2 parts of sulphur and 2 parts of zinc diethyl dithiocarbamate are milled together on a two-roll rubber mill at a temperature of 50–60° C. until the ingredients are thoroughly dispersed. The mixture is removed from the mill and heated in a suitable mould under hydraulic pressure at a temperature of 141° C. for 30 minutes.

The vulcanised material is not thermoplastic, and it has a low permanent set and a high resilience. It is solvent resistant, for example, it is not dissolved by benzene or benzene-ethanol mixtures, although some swelling takes place. Some of its physical properties are as follows:

| | |
|---|---|
| Tensile strength, kg./cm.$^2$ | 62 |
| Elongation at break, per cent | 167 |
| Shore hardness at 20° C | 57 |
| Resilience at 50° C | 51.3 |
| Swelling in benzene (2 days at 20° C.), by volume | 93 |

The unvulcanised polymeric material disintegrates when immersed in benzene ethanol. It is thermoplastic, has a high permanent set, and its resilience at 50° C. is too low to be measured.

The organic diisocyanate-modified unsaturated polyester used in this example is obtained as follows: 1917 parts of adipic acid, 441 parts of maleic anhydride and 1126 parts of ethylene glycol are heated together under nitrogen up to 190° C. during 9 hours, and the mixture is then subjected to continuous azeotropic distillation with xylene at 185–190° for 36 hours. The xylene is then removed. The product is a pale yellow syrup of acid value 16.6 mgm. KOH per gm. 1000 parts of this syrup are heated to 70° C. in an internal mixer of the Baker-Perkins type. 55 parts of hexamethylene diisocyanate are added and the mixture is stirred for 5 minutes. The stirred mix is poured, to give layers 1" thick, into metal trays 2" deep, which have previously been coated on the inside with the high-melting grease obtained by dissolving 15 parts of aluminium stearate in 25 parts of lubricating oil. The trays and contents are then heated in an oven at 100° C. for 12 hours, after which time they are taken out, cooled, and the polymeric material is removed. It is a soft, pale yellow, rubber-like material which does not harden on standing.

Example 2

100 parts of the organic diisocyanate-modified unsaturated polyester described in Example 1, 5 parts of tricresyl phosphate, 1 part of stearic acid, 60 parts of carbon black, 5 parts of sulphur and 2 parts of zinc diethyl dithiocarbamate are milled together on a two-roll rubber mill at a temperature of 50–60° C. until the ingredients are thoroughly dispersed. The mixture is heated in a suitable mould under hydraulic pressure at a temperature of 141° C. for 15 minutes.

The vulcanised material is not thermo-plastic, and it has a low permanent set and a high resilience.

Some of its physical properties are as follows:

| | |
|---|---|
| Tensile strength, Kg. cm.$^2$ | 94 |
| Elongation at break, per cent | 300 |
| Shore hardness at 20° C | 49 |
| Resilience at 50° C | 46.0 |
| Swelling in benzene (2 days at 20° C.), per cent by volume | 82 |

Example 3

100 parts of an organic diisocyanate-modified unsaturated polyester, 0.5 part of stearic acid, 30 parts of carbon black, 2 parts of sulphur and 2 parts of zinc diethyl dithiocarbamate are milled together on a two-roll rubber mill at a temperature of 50–60° C. for 15 minutes. The mixture is removed from the mill and heated in a suitable mould under hydraulic pressure at 125° C. for 60 minutes.

The vulcanised material is non-thermoplastic, highly resilient and resistant to solvents, for example, it is not dissolved by benzene or benzene-ethanol mixtures. Some of its physical properties are as follows:

| | |
|---|---|
| Tensile strength, Kg. cm.$^2$ | 89 |
| Elongation at break, per cent | 360 |
| Permanent set after 200% extension, per cent | 8.8 |
| Shore hardness at 20° C | 81 |
| Resilience at 50° C | 40.0 |

The unvulcanised material is thermoplastic and it has a high permanent set. Its resilience at 50° C. is too low to be measured.

The organic diisocyanate modified unsaturated polyester used in this example is obtained as follows: 1489 parts of adipic acid, 209 parts of fumaric acid and 751 parts of ethylene glycol are mixed together and heated with stirring whilst a stream of nitrogen is passed over the heated mixture, the temperature being raised during 5 hours to 190° C. The mixture is maintained at 190–195° C. and subjected to continuous azeotropic distillation with xylene for 24 hours. The xylene is then removed. There is thus obtained a viscous, pale yellow syrup of acid value of 14 mgm. KOH per gm., which gradually solidifies on standing. 1426 parts of this syrup are heated to 70° C., 57 parts of hexamethylene diisocyanate added and the mixture is stirred for 10 minutes. The mixture is then put into and heated in trays in an oven at 100° C. for 12 hours, in the manner described in Example 1. The product is a soft, plastic, rubbery material.

Example 4

100 parts of an organic diisocyanate-modified unsaturated polyester-amide, 0.5 part of stearic acid, 30 parts of carbon black, 2 parts of sulphur and 2 parts of zinc diethyl dithiocarbamate are milled together on a two-roll rubber mill at 50° C. for 15 minutes. The mixture is removed from the mill and heated in a suitable mould under hydraulic pressure at 125° C. for 60 minutes.

The vulcanised material is a soft, elastic material of low permanent set. Some of its physical properties are as follows:

Tensile strength, Kg./cm.² ............... 67
Elongation at break, per cent ............ 450

It is only slightly softened by heating for 14 days in lubricating oil at 70° C. The unvulcanised material is thermo-plastic and it has a high permanent set.

The organic diisocyanate-modified unsaturated polyester-amide used in this example is prepared as follows: 394 parts of adipic acid, 35 parts of maleic acid, 156.5 parts of ethylene glycol and 30.5 parts of ethanolamine are mixed together and heated up to 200° C. during 7 hours, whilst a stream of nitrogen is passed over the mixture. The mixture is maintained at 200° C. with continuous azeotropic distillation with xylene for 14 hours. The xylene is then removed. The product is a viscous, orange syrup of acid value of 13 mgm. KOH per gm. 380 parts of this syrup are heated up to 140° C. in a steam-heated internal mixer, and 4 parts of hexamethylene diisocyanate added and mixed into the syrup. After 15 minutes, a soft rubbery material is obtained.

*Example 5*

100 parts of the organic diisocyanate-modified unsaturated polyester described in Example 1, 2 parts of stearic acid, 3 parts of carbon black, 3 parts of sulphur and 1½ parts of zinc diethyl dithiocarbamate are milled together on a two-roll rubber mill at 50° C. for 15 minutes. The milled mass is made into a dough by adding 300 parts of a mixture of benzene and ethanol (80:20 by volume) and warming to 70° C. After cooling, the dough is spread onto a fabric, and the coated fabric is heated in hot air at 130° C. for 60 minutes. The so-obtained coated material is more resistant to the action of solvents, particularly benzene and benzene-ethanol mixtures, is more crease-resistant and is less readily softened by heat than a coated material made in the same way except that the sulphur and the accelerator are omitted from the compounding.

*Example 6*

100 parts of the organic diisocyanate modified unsaturated polyester described in Example 1, 5 parts of tricresyl phosphate, 0.5 part of stearic acid, 60 parts of carbon black, 3.5 parts of sulphur and 1.5 parts of tetraethylthiuram disulphide are milled together on a two-roll rubber mill at a temperature of 50-60° C. until the ingredients are thoroughly dispersed. The mix is removed from the mill and heated in a mould under hydraulic pressure at 141° C. for 90 minutes.

The so obtained vulcanised material is non-thermoplastic, highly resilient and resistant to solvents. Some of its physical properties are:

Tensile strength, Kg./cm.² ............... 50-50
Elongation at break, per cent ............ 300-350
Modulus at 100% extension ............... 28
Shore hardness at 20° C .................. 50-60
Resilience at 50° C., per cent ........... 65
Resilience at 100° C., per cent .......... 70
Swelling in benzene (2 days at 20° C.), per cent by volume ....................... 80

We claim:

1. A process which comprises commingling a soft, rubbery diisocyanate modified polymer with 1 to 5 parts by weight of sulfur per 100 parts by weight of the modified polymer, together with a vulcanization accelerator, said diisocyanate modified polymer being the reaction product of a low molecular weight polymer and from 1% to 10% by weight of said polymer of a hydrocarbon diisocyanate and said polymer being of the class consisting of polyesters containing recurring intralinear carboxylic ester groups and polyesteramides containing recurring intralinear carboxylic ester groups and recurring intralinear carbonamide groups, the ratio of said ester groups to said carbonamide groups being at least 1:1, said low molecular weight polymer having been formed from polymer-forming ingredients, at least one of which contains an unsaturated linkage of the non-benzenoid carbon-to-carbon type with the reactants containing the unsaturated linkage being from 5 to 25 parts by weight per 100 parts by weight of the polymer-forming ingredients, and thereafter heating the mixture to effect vulcanization.

2. The process of claim 1 characterized in that the mixture to be vulcanized contains 1 to 2 parts by weight of the vulcanization accelerator per 100 parts by weight of polymeric material.

3. The process of claim 1 characterized in that the heating is effected for 30 to 90 minutes at a temperature of 100° to 150° C.

4. The process of claim 1 characterized in that the low molecular weight polymer is obtained from reactants containing a dicarboxy compound having non-benzenoid carbon-to-carbon unsaturation.

5. The product produced by the process of claim 1.

6. The product produced by the process of claim 1 in which process there is used from 1 to 2 parts by weight of vulcanization accelerator per 100 parts by weight of the polymeric material.

7. The product produced by the process of claim 1 which process is effected with heating for 30 to 90 minutes at a temperature of 100° to 150° C.

8. The product produced by the process of claim 1 which process is characterized in that the low molecular weight polymer is produced from reactants containing a dicarboxy compound having non-benzenoid carbon-to-carbon unsaturation.

JAMES GORDON COOK.
DAVID AUGUSTINE HARPER.
REGINALD JOHN WILLIAM REYNOLDS.
WALTER FAIRBAIRN SMITH.

REFERENCES CITED

The following references are of record in the file of this patent:

UNITED STATES PATENTS

| Number | Name | Date |
|---|---|---|
| 2,282,827 | Rothrock | May 12, 1942 |
| 2,373,015 | Cowan et al. | Apr. 3, 1945 |

FOREIGN PATENTS

| Number | Country | Date |
|---|---|---|
| 537,865 | Germany | Nov. 7, 1931 |
| 395,217 | Germany | July 13, 1933 |

Certificate of Correction

Patent No. 2,424,884. July 29, 1947.

JAMES GORDON COOK ET AL.

It is hereby certified that errors appear in the printed specification of the above numbered patent requiring correction as follows: Column 3, line 20, for "harness" read *hardness*; column 6, line 66, for "mixture" read *mix*; column 7, line 68, for "50-50" read *50-80*; and that the said Letters Patent should be read with these corrections therein that the same may conform to the record of the case in the Patent Office.

Signed and sealed this 2nd day of September, A. D. 1947.

[SEAL]

LESLIE FRAZER,
*First Assistant Commissioner of Patents.*